(No Model.)

A. FERRARI.
GLASS FURNACE.

No. 407,187. Patented July 16, 1889.

WITNESSES:
Th. Rollé.
James F. Kelly.

INVENTOR:
Andrew Ferrari
BY John A. Wiedersheim
ATTORNEY.

UNITED STATES PATENT OFFICE.

ANDREW FERRARI, OF GLASSBOROUGH, NEW JERSEY, ASSIGNOR, BY MESNE ASSIGNMENTS, TO THE WHITNEY GLASS WORKS, OF NEW JERSEY.

GLASS-FURNACE.

SPECIFICATION forming part of Letters Patent No. 407,187, dated July 16, 1889.

Application filed September 15, 1887. Serial No. 249,741. (No model.)

*To all whom it may concern:*

Be it known that I, ANDREW FERRARI, a citizen of the United States, residing at Glassborough, in the county of Gloucester, State of New Jersey, have invented a new and useful Improvement in Glass-Furnaces, which improvement is fully set forth in the following specification and accompanying drawings.

My invention relates to improvements in glass-furnaces; and it consists of the combination of parts, as herein set forth and claimed.

Figure 1:
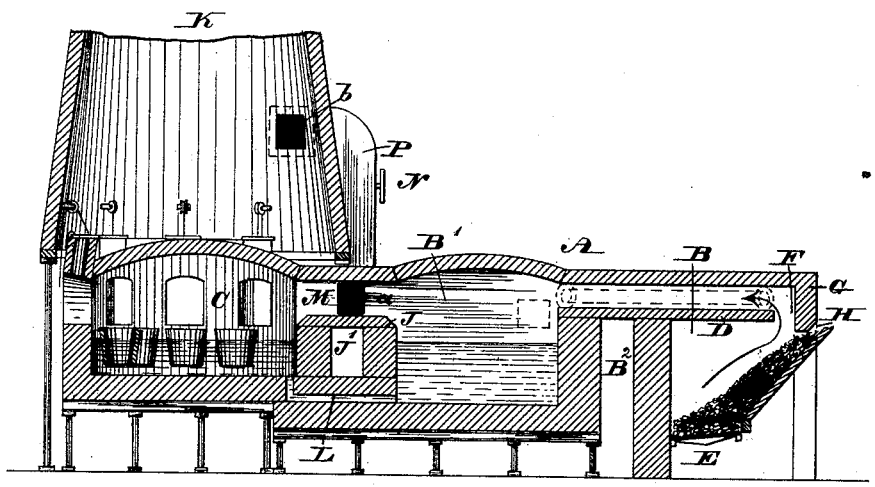
Figure 2:
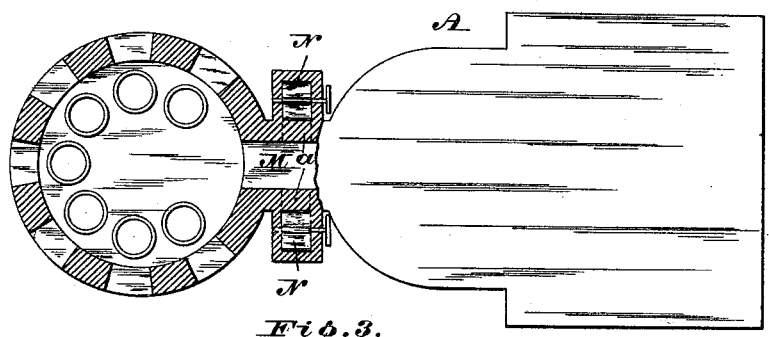
Figure 3:
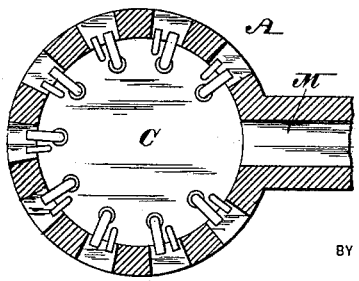

Figure 1 represents a longitudinal vertical section of a glass-furnace embodying my invention. Fig. 2 represents a partial horizontal section and a partial top view thereof. Fig. 3 represents a horizontal section of the modification of the pot-chamber, in that it is provided with boot-legs instead of pots, as in Fig. 2.

Similar letters of reference indicate corresponding parts in the several figures.

Referring to the drawings, A represents a glass-furnace, of which B represents the combustion-chamber or fire-box, B' the batch-chamber, and C the glass or pot chamber.

D represents a horizontal deflector, which is located within the combustion-chamber at the top thereof, and projects forwardly from the back of said chamber, so as to overhang the grate E and leave a throat F between the deflector and the front wall G of the chamber, it being noticed that said wall G has an inlet H for the fuel.

J represents the bridge in the batch-chamber, the products of combustion passing over the same on their way to the stack K. Below said bridge is a channel L, which extends horizontally along the sole of the chamber B', and then vertically therefrom, and so communicates with the pot-chamber C at the sole of the latter, it being noticed that the sole of the batch-chamber B' is lower than that of the chamber C. By this provision only pure glass from the chamber B' is caused to enter the chamber C, the same flowing through the channel L from one chamber to the other. The scum or impurities rise to the top of the partly-molten glass in the chamber B'. The fully-molten glass, owing to its specific gravity, sinks to the bottom of said chamber, and as the supply of fully-molten glass continues said glass flows through the channel L and rises in the working-chamber C, whereby only pure glass enters the other.

M represents the neck or passage between the batch and pot chambers, the same having at its side the valves N, whose chambers P join said neck and the stack K, as at $a\ b$. By this provision the heat in the chamber C may be regulated, and when the workmen are engaged at said chamber the products of combustion and heat from the batch-chamber may be passed directly into the stack, thus relieving the workmen of the intensity of the same.

The chamber C is of circular form, so that, excepting at the neck M, the entire outer surface of chamber C is available for the access of the workmen to the holes in the wall of said chamber, and thus a large number of workmen are enabled to gather around the chamber.

Owing to the deflector D in the combustion-chamber the products of combustion are directed upwardly along the inclined front portion of the grate on their way to the throat F, so as to heat the fuel, and quickly heat fresh fuel as added, thus preventing to a material extent the chilling influence of the latter.

In lieu of the deflector D, I may employ a pipe or pipes, as shown in dotted lines, Fig. 1, the same acting as a deflector and directing the products of combustion from the chamber B to the chamber B'.

The bridge J has an air-space J' at the center thereof, so as to resist the destructive influence of the heat on said bridge.

The back wall of the chamber B is separated from the front wall of the batch-chamber B' by an air-space $B^2$, whereby said walls resist the destructive influence of heat thereon, said space also separating said chambers B B', so that either chamber may be removed or demolished without disturbing the other chamber. The chambers C B' may also be removed or demolished without disturbing each other, the stack, or the chamber B.

Having thus described my invention, what I claim as new, and desire to secure by Letters Patent, is—

1. A glass-furnace consisting of a fire-box, a batch-chamber with a separate front wall from the back wall of the fire-box, and a bridge forming a top passage and a lower channel, a pot-chamber communicating with said batch-chamber by said passage and channel, a stack above said pot-chamber, and side chamber leading from top passage to said stack and having valves therein, said parts being combined substantially as and for the purpose set forth.

2. A glass-furnace consisting of a fire-box, a batch-chamber with a bridge having an air-space in the same, said bridge forming a top passage and a lower channel, a pot-chamber in communication with said passage and channel, and side chambers provided with valves and leading from said top passage to a stack above the said pot-chamber, the floor of the lower channel being on a level with the floor of the batch-chamber and below that of the pot-chamber, and the air-space in the bridge being above the lower channel, said parts being combined substantially as described.

ANDR. FERRARI.

Witnesses:
JOHN A. WIEDERSHEIM,
A. P. JENNINGS.